(12) United States Patent
Sone et al.

(10) Patent No.: US 6,424,888 B1
(45) Date of Patent: Jul. 23, 2002

(54) CALL RESPONSE METHOD FOR VEHICLE

(75) Inventors: Akira Sone; Masuo Sugiura, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/481,515

(22) Filed: Jan. 12, 2000

(30) Foreign Application Priority Data

Jan. 13, 1999 (JP) .......................................... 11-006912

(51) Int. Cl.[7] .......................... G05D 1/00; G01L 22/00; G06F 7/00
(52) U.S. Cl. ............................ 701/1; 701/28; 701/36; 701/211; 455/414; 455/569; 455/550; 455/566; 455/567; 379/52; 348/14.01; 348/14.02; 348/14.03; 348/14.06
(58) Field of Search ............................ 701/1, 36, 28, 701/211; 455/414, 569, 566, 550, 567; 345/329, 330; 379/52, 90.01, 96, 100.06; 348/14.01–14.06

(56) References Cited

U.S. PATENT DOCUMENTS

| | | | | |
|---|---|---|---|---|
| 5,055,822 A | * | 10/1991 | Campbell et al. ............ 340/407 |
| 5,465,079 A | * | 11/1995 | Bouchard et al. ............ 340/576 |
| 5,884,191 A | * | 3/1999 | Karpus et al. ............... 455/557 |
| 6,044,248 A | * | 3/2000 | Mochizuki et al. ......... 455/38.4 |
| 6,094,213 A | * | 7/2000 | Mun et al. ..................... 348/15 |

FOREIGN PATENT DOCUMENTS

JP  10-304464  11/1998

* cited by examiner

*Primary Examiner*—Jacques H. Louis-Jacques
*Assistant Examiner*—Brian J Broadhead
(74) *Attorney, Agent, or Firm*—Finnegan, Henderson, Farabow, Garrett, & Dunner, L.L.P.

(57) ABSTRACT

A call response method for a vehicle used in a vehicle to respond to a call received from another system includes following steps: performing a call reception previous notification for previously signaling a call reception at a predetermined interval to appeal to one sense or a combination of at lease two senses among a sense of hearing, a sense of smell and a sense of touch of a driver except for a sense of sight of the driver when a call including at least an image is received in the vehicle from another system; and performing a call reception main notification for presenting the image included in the call to appeal to the sense of sight of the driver, after performing the call reception previous notification except of the sense of sight.

6 Claims, 3 Drawing Sheets

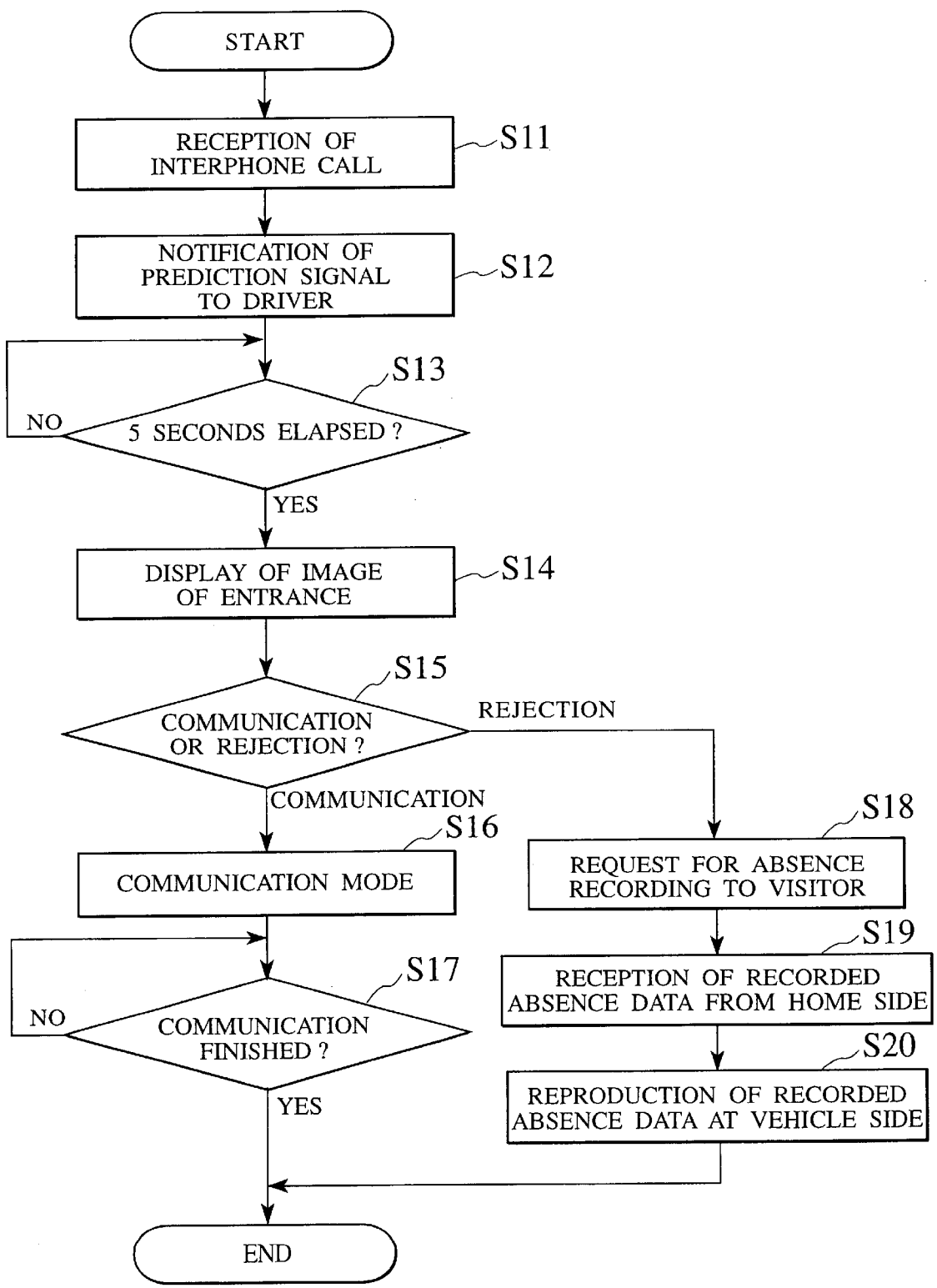

CALL RESPONSE METHOD FOR VEHICLE

BACKGROUND OF THE INVENTION

1. Field of the Invention

The present invention relates to a call response method for a vehicle, which is used in such a vehicle as an automobile when a call has been received from another system, and in particular to a call response method which can realize a call response based upon a safety drive of a driver, for example, even when a call including at least an image has been received.

2. Description of the Related Art

As a conventional apparatus for a call response in a vehicle, there has been a disclosed apparatus. The disclosure relates to subject matters contained in Japanese Patent Application Laid-Open No. HEI 10-304464, the disclosure of which is expressly incorporated herein by reference in its entirety. As disclosed in the Patent Application Laid-Open publication, for example, there has been well known a hand-free device which is mounted on such a vehicle as an automobile and is configured so as to be capable to responding to a call which has been received from another system.

In the above Patent Application Laid-Open publication, there has been disclosed a control method for a hand-free device which has been configured such that, during a telephonic communication, when it is predicted that a driving load may be increased within a predetermined interval or when it has been determined that a current state is in such an increased driving load state, the telephonic communication is reserved temporarily.

According to the control method for a hand-free device which has been disclosed in the publication, since during a telephonic communication, when it is predicted or expected that a driving load may be increased within predetermined intervals or when it has been determined that a current state is in such an increased driving load state, the telephonic communication is reserved temporarily, a response based upon a safety drive during a telephonic communication can be achieved.

However, in the above conventional method for controlling a telephone communication reservation, there is a drawback to be solved that, for example, when a call including at least image is received, a response to the call is performed by instantaneously presenting the image included in the received call to the driver so that the driver's eyes are temporarily attracted to the image, which leads to lack in his/her concentration to driving to obstruct attainment of a call response based on a safety drive, as a result.

A development of a novel technique which can attain a call response based upon a safety drive, for example, even when a call including at least an image is received has been expected.

SUMMARY OF THE INVENTION

The present invention has been attained in view of the above circumstances, and an object thereof is to provide a call response method for a vehicle, which can attain a call response based upon a safety drive, for example, even when a call including at least an image is received, by, when a call including at least an image is received in a vehicle from another system, performing a call reception previous notification for previously signaling a call reception at predetermined intervals to appeal to one sense of the senses of hear, smell and touch of a driver except for the sense of sight of a driver or a combination of at lease two of the senses, and, after performing the call reception previous notification except of the sense of sight, performing a call reception main notification for presenting the image included in the call to appeal to the sense of sight of the driver.

In order to achieve the object, according to a first aspect of the present invention, there is provided a call response method for a vehicle used in a vehicle to respond to a call received from another system, comprising the steps of: performing a call reception previous notification for previously signaling a call reception at a predetermined interval to appeal to one sense or a combination of at lease two senses among a sense of hearing, a sense of smell and a sense of touch of a driver except for a sense of sight of the driver when a call including at least an image is received in the vehicle from another system; and performing a call reception main notification for presenting the image included in the call to appeal to the sense of sight of the driver, after performing the call reception previous notification except of the sense of sight.

According to the first aspect, when a call including at least an image, is received in a vehicle, a call reception previous notification for previously signaling the reception of the call is performed only at a predetermined interval to appeal to one sense of the senses of hear, smell and touch of a driver except for his/her sense of sight or a combination of at lease two of the senses, and after the call reception previous notification except of the sense of sight has been performed, a call reception main notification for presenting the image included in the call is performed to appeal to the sense of sight of the driver. Therefore, for example, even when a call including at least an image is received, the call reception main notification which appeals to the sense of sight of the driver with an elapse of the predetermined intervals after the call reception previous notification has been performed is performed, so that a call response based upon a safety drive can be realized.

A second aspect of the invention is a call response method for a vehicle as it depends from the first aspect, wherein the call reception previous notification which appeals to the sense of hear of a driver generates a sound or voice for previously signaling a call reception.

According to the second aspect, the call reception previous notification for appealing to the sense of hear of a driver is performed by generating a sound or voice for previously signaling a call reception. Therefore, for example, even when a call including at least an image is received, with an elapse of the predetermined intervals after the call reception previous notification which does to appeal the sense of sight of a driver has been performed, the call reception main notification which appeals to the sense of sight of a driver is performed, so that a call response based upon a safety drive can be realized.

Also, a third aspect of the invention is a call response method for a vehicle as it depends from the first or the second aspect, wherein the call reception previous notification which appeals to the sense of smell is performed by generating smell which previously notifies a call reception.

According to the third aspect, the call reception previous notification which appeals to the sense of smell is performed by generating smell which previously notifies a call reception. Therefore, for example, even when a call including at least an image is received, with an elapse of the predetermined intervals after the call reception previous notification which does not appeal the sense of sight of a driver has been performed, the call reception main notification which appeals to the sense of sight of a driver is performed, so that a call response based upon a safety drive can be realized.

Furthermore, a fourth aspect of the invention is a call response method for a vehicle as it depends from one aspect among the first aspect to the third aspect, wherein the call reception previous notification which appeals to the sense of touch is performed by generating vibration which predicts a call reception.

According to the fourth aspect, the call reception previous notification which appeals to the sense of touch is performed by generating vibration which predicts a call reception. Therefore, for example, even when a call including at least an image is received, with an elapse of the predetermined intervals after the call reception previous notification which does not appeal the sense of sight of a driver has been performed, the call reception main notification which appeals to the sense of sight of a driver is performed, so that a call response based upon a safety drive can be realized.

In addition, a fifth aspect of the invention is a call response method for a vehicle as it depends from one aspect among the first aspect to the fourth aspect, wherein the vibration which previously notifies the call reception is given to at least one of a steering wheel and a driver's seat in the vehicle.

According to fifth aspect, the vibration which previously notifies the call reception is given to at least one of a steering wheel and a driver's seat in the vehicle. Therefore, for example, even when a call including at least an image is received, with an elapse of the predetermined intervals after the call reception previous notification which does not appeal the sense of sight of a driver has been performed, the call reception main notification which appeals to the sense of sight of a driver is performed, so that a call response based upon a safety drive can be realized.

Also, a sixth aspect of the invention is a call response method for a vehicle as it depends from one aspect among the first aspect to the fifth aspect, wherein the call which has been received in the vehicle from the another system is an interphone call including at least an image which has been received from a home interphone which has been provided on a home side.

According to the sixth aspect, the call which has been received from the another system is an interphone call including at least an image which has been received from a home interphone which has been provided on a home side. Therefore, for example, even when a call including at least an image is received, with an elapse of the predetermined intervals after the call reception previous notification which does not appeal the sense of sight of a driver has been performed, the call reception main notification which appeals to the sense of sight of a driver is performed, so that a call response based upon a safety drive can be realized.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 4 is a flowchart showing an operation/action procedure of the call response method for a vehicle according to the present invention.

DETAILED DESCRIPTION OF THE PREFERRED EMBODIMENTS

Figure 1:
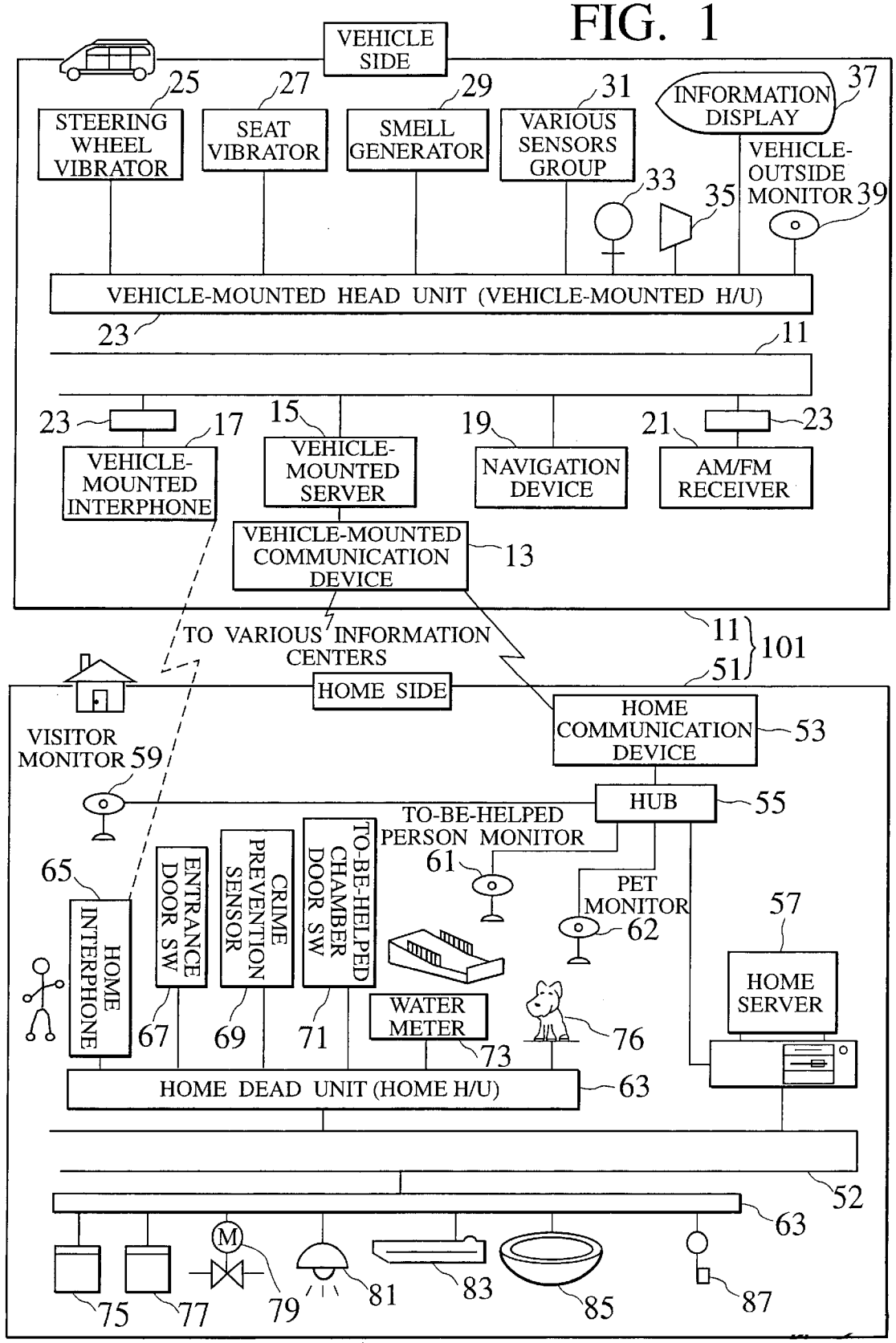
FIG. 1 is a functional configuration diagram showing a peripheral system of a call response system for a vehicle embodying a call response method for a vehicle according to the present invention.

There will be detailed below the preferred embodiments of the present invention with reference to the accompanying drawings. Like members are designated by like reference characters.

First, a schematic configuration of a system embodying the call response method of a vehicle according to the present invention will be explained with reference to FIG. 1.

In FIG. 1, there is illustrated a function block configuration diagram of a call response system 11 for a vehicle and a peripheral system thereof which embody the call response method for a vehicle according to the present invention. Incidentally, in this embodiment, explanation will be given, as one example, of a bidirectional communication information utilization system 101 for utilizing bidirectional communication information between a vehicle and a home for a desired application.

As illustrated in FIG. 1, the bidirectional communication information utilization system 101 is constituted with a call response system 11 for a vehicle mounted on a vehicle side and a home side network system 51 provided on a home side.

The call response system 11 for a vehicle has an information collection function for performing integrated information collection of vehicle side information and home side information captured from the home side, where the vehicle side information includes, for example, information including such own vehicle information as a vehicle speed, a steering wheel angle, presence/absence of an obstacle in an advancing direction of an own vehicle and inter-vehicle distance between an own vehicle and a vehicle ahead of the own vehicle, information including traffic/road conditions about an own vehicle position captured from a navigation system, information including weather conditions about an own vehicle position captured from a weather information provider, information including a body condition of a driver such as a heartbeat rate, brain waves or the like, or other information; and an information utilization function for utilizing various information captured by performing the information collection function for applications for providing various services which are keywords "safety", "comfortability" and "convenience". The call response, system 11 for a vehicle is constituted with a vehicle-mounted network 12, a vehicle-mounted communication device 13, a vehicle-mounted server 15, a vehicle-mounted interphone 17, a navigation device 19, an AM/FM receiver 21, a vehicle-mounted head unit (hereinafter, referred to "vehicle-mounted H/U) 23, a steering wheel vibrator 25, a seat vibrator 27, a smell generator 29, a various sensors group 31, a vehicle-mounted", microphone 33, vehicle-mounted loudspeaker 35, a vehicle-mounted display 37, a vehicle inside and outside monitor cameras 39, and the like.

The vehicle-mounted network 12 is constituted with an appropriate transmission medium such as an optical fiber cable or the like, and it has a information relaying function for relaying bidirectional information communication among respective nodes of the vehicle-mounted server 15, the navigation device 18 and the vehicle-mounted H/U 23.

The vehicle-mounted communication device 13 has a function for relaying various information in both directions among the home side, various information centers, PHSs, portable telephones, public subscriber telephones and the like, via such a transmission media as a radio wave LAN (Local Area Network), a portable telephone network or the like.

The vehicle-mounted server 15 has an information processing function for integrating information which has been collected at the vehicle side and information captured at the home side to process the same, a device control function for performing drive control on various vehicle-mounted devices and performing power control on the basis of data obtained by performing the information processing function, and the like.

Figure 2:
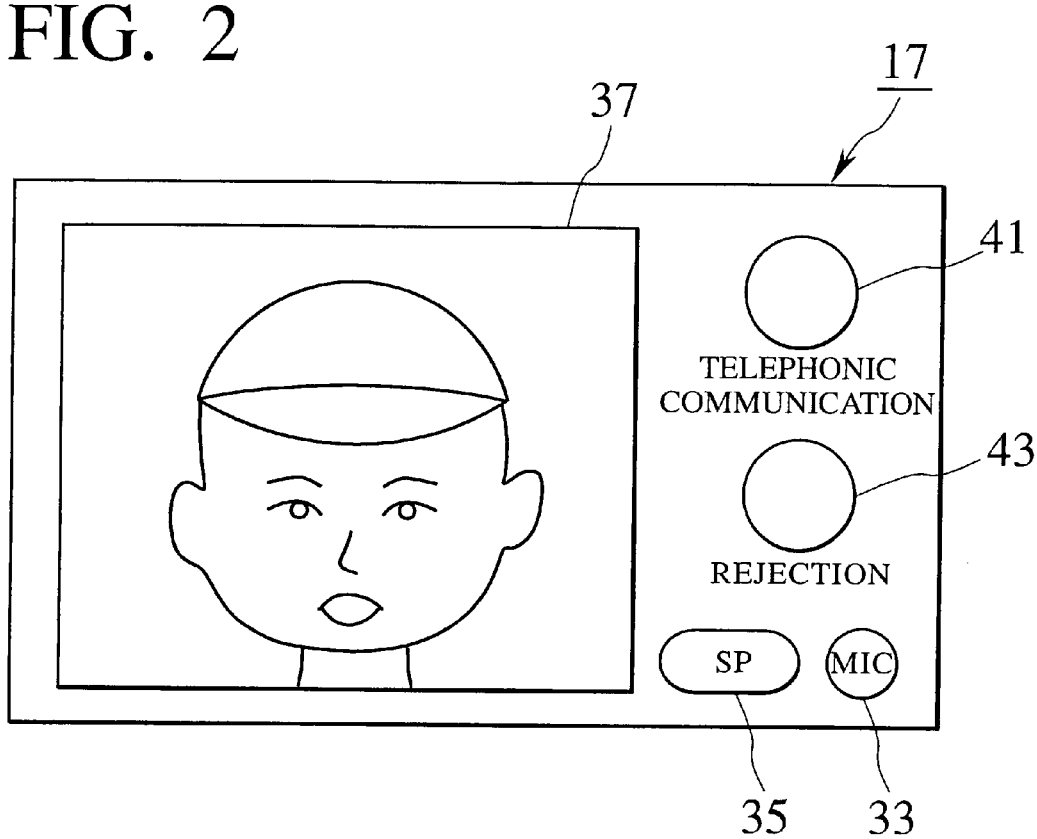
FIG. 2 is an explanatory view illustrating an appearance of a vehicle-mounting interphone.
Figure 3:
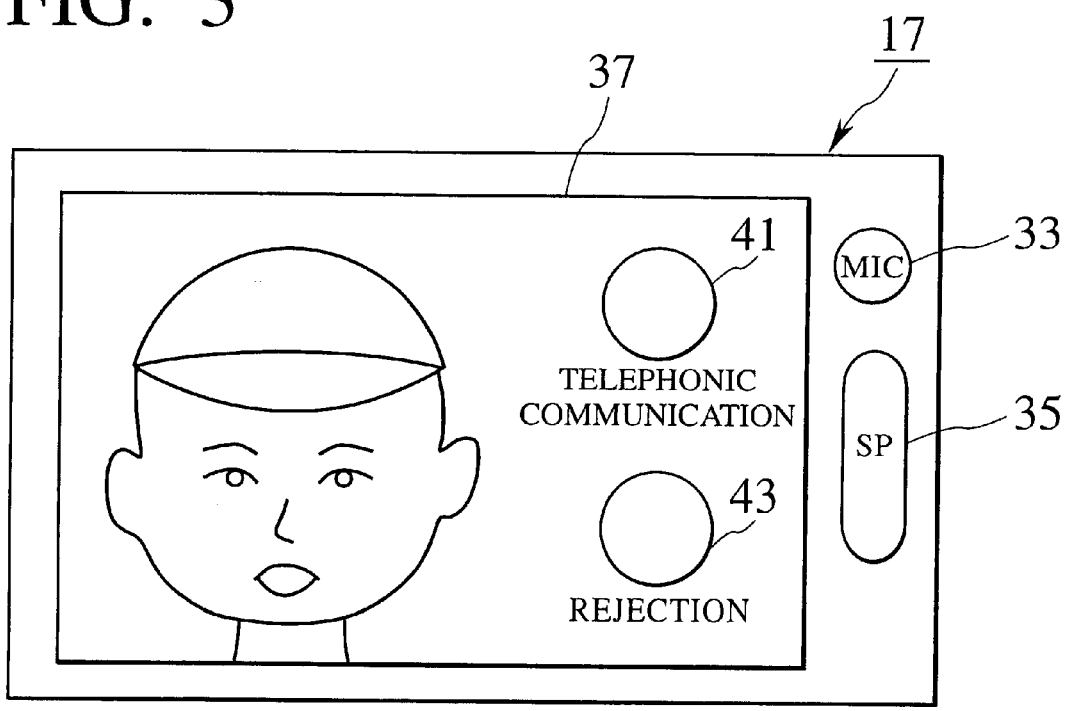
FIG. 3 is an explanatory view illustrating an appearance of another vehicle mounting interphone different from that in FIG. 2.

The vehicle-mounted interphone 17 has a function for responding to an interphone call from the home side, and/or a call from a PHS or a portable phone. For example, as illustrated in FIG. 2, the vehicle-mounted interphone 17 is constituted with a telephonic communication button 41 which is operated to input when a communication is performed in response to a call, and a rejection button 43 which is operated to input when a communication is rejected without responding to a call. The vehicle-mounted interphone 17 is not limited to a structure where the above communication and rejection buttons 41, 43 are provided in a fixed manner, but, for example, as illustrated in FIG. 3, the communication and rejection buttons 41, 43 may be configured so as to appear on a touch-panel type vehicle-mounted display 37 whenever operational input on these buttons is required.

The navigation device 19 has a function for measuring an own vehicle position using a self-contained navigation positioning and/or a satellite navigation positioning, a function for displaying traffic jam information, parking space information or the like on a map, a function for guiding an own vehicle to a driver's destination by displaying a route reaching his/her destination or informing a driver of the route, and the like.

The AM/FM receiver 21 has a function for receiving VICS information provided via FM multi-broadcasting from, for example, a vehicle information communication system (VICS) or a road traffic information communication system.

The vehicle-mounted H/U 23 has a function for interfacing with the various sensors group 31 described later, or various actuators such as the steering wheel vibrator 25 and the like, and a device control function for performing drive control and power control on various vehicle-mounted devices.

The steering wheel vibrator 25 is built in a steering wheel used when a vehicle is steered and has a function for stimulating the sense of touch of a driver by vibrating the palm of his/her hand(s).

The seat vibrator 27 is built in a driver's seat and has a function for stimulating the sense of touch of a driver by vibrating his/her back, a leg(s) or the like.

The smell generator 29 is provided at an appropriate portion or a dashboard or the like in a vehicle interior and has a function for stimulating the sense of smell of a vehicle occupant(s) with smell.

The various sensors group 31 is constituted with a speed sensor for detecting an own vehicle speed, a steering angle sensor for detecting an own vehicle steering angle, an obstacle sensor for detecting presence/absence of an obstacle in an own vehicle advancing direction, an inter-vehicle distance sensor for detecting the distance between an own vehicle and a vehicle ahead, a heartbeat rate sensor for measuring the heartbeat rate of a driver, a brain waves sensor for measuring the brain waves of a driver, a front passenger seat sitting sensor for detecting whether or not a passenger is sitting on a front passenger seat, and the like.

The vehicle-mounted microphone 33 has a function for inputting a voice of a vehicle occupant.

The vehicle-mounted loudspeaker 35 has a function for outputting a voice or sound to a vehicle occupant.

The vehicle-mounted display 37 is provided on, for example, a dashboard or the like in a vehicle, and is used to display various information such as various information used in the bidirectional communication information utilization system 101, various information transmitted from the home side, various notification information and the like.

Incidentally, the vehicle-mounted microphone 33, the vehicle-mounted loudspeaker 35, and the vehicle-mounted display 37 are assembled in the vehicle-mounted interphone 17, for example, as illustrated in FIG. 2 or 3.

The vehicle inside and outside monitor cameras 39 are respectively provided inside and outside the vehicle, and they have functions for photographing inside and outside of the vehicle, respectively.

Meanwhile, the home side network system 51 has an information collection function for performing integrated information collection of various home side information and vehicle side information captured from the vehicle side, and an information utilization function for utilizing various information obtained by performing the information collection function for applications providing various services which are keywords "safety", "comfortability" and "convenience". The various home side information includes information obtained by always monitoring a lock/unlock state of an entrance door key, an opened/closed state of each of a plurality of windows provided at respective places of a home, an opened/closed state of each of the entrance door or respective room doors, a change on standing in the amount used of each of water, gas, electric power and the like, an emergency notification condition occurrence state such as gas leakage, fire, theft or the like, a state of each of a visitor, a person to be helped such as, a child, an aged man/woman or the like, such a pet animal as a dog, a cat, or the like. The home side network system 51 is constituted with a home network 52, a home communication device 53, a hub (HUB) 55, a home server 57, a visitor monitor camera 59, a to-be helped person monitor camera 61, a pet animal monitor camera 62, a home head unit (hereinafter, referred to "home H/U") 63, home interphones 65, an entrance door switch (hereinafter, referred to "entrance door SW) 67, a crime prevention sensor 69, a person-to-be-helped room door switch (hereinafter, referred to "a helping room door SW) 71, a water meter 73, a fire alarm 75, a pet animal feed supplying device 76, a gas leakage detector 77, a gas cutting-out device 79, an illumination equipment 81, an air-conditioning equipment 83, a bath hot water supplying device 85, an entrance door locking/unlocking device 87, and the like.

The home network 52 is constituted by using an appropriate transmission medium such as an IEEE 1394·100BASE-T(Ethernet), a radio wave LAN, or the like, and it has an information communication relaying function for relaying bidirectional information between respective nodes of the home server 57 and the home H/U 63.

The home communication device 53 has a function for to transmitting/receiving various information between the vehicle side and the home side via, for example, a radio wave LAN (Local Area Network) or the like.

The HUB 55 has a function for amplifying and relaying an image taken in from each of the monitor cameras 59, 61, 62. Incidentally, as a cable such as 10 BASE-T, 100 BASE-T or the like is used as a cable connecting between the HUB 55 and each of the respective monitor cameras 59, 61, 62.

The home server 57 has an information processing function for integrating and processing information collected at the home side and information captured from the vehicle side, and a device control function for performing drive control and power control on various home electrical apparatuses on the basis of data obtained by performing the information processing function.

The visitor monitor camera 59 is mounted at an entrance of a home and it has a function for photographing a visitor or the like which has come at the entrance of the home.

The to-be-helped person monitor camera 61 is mounted in a helping room where a to-be-helped person is mainly living, and it has a function for photographing an image of a to-be-helped person.

The pet animal monitor camera 62 is mounted at a position from which a place where such a pet animal as a dog, a cat or the like is mainly living can be looked over, and it has a function for photographing an image of the pet animal.

The home H/U 63 has a function for interfacing with various devices including the home interphone 65 and various sensors such as the entrance door SW 67 and the like, and a device control function for performing drive control and power control on various home electrical apparatuses.

The home interphones 65 are respectively mounted at at least the entrance and a living room, and the home interphone 65 at the entrance has a function for, when a call button provided at the entrance, interphone is pushed by the visitor, displaying/signaling an image/a voice of a visitor on/to the room side interphone in its home mode, while displaying/signaling the same on/to the vehicle-mounted interphone 17 in its absence mode.

The entrance door SW 67 has a function for detecting and outputting an opened/closed state of an entrance door.

The crime prevention sensor 69 has a function for assuming that, when any of opening/closing members such as the entrance door, respective room door, windows provided at respective places of a home, and the like is opened, for example, the home is put in a dangerous state, to output a crime prevention signal, while an operation mode of a home security system for maintaining a home safe is in an alarm mode.

The to-be-helped person room door SW 71 has a function for detecting an opened/closed state of a to-be-helped person room door the day to store and output a record of the state.

The water meter 73 has a function for detecting a change on standing of the mount used of water/drain water to store and output the same.

The fire alarms 75 are mounted on, for example, ceiling portions of a kitchen, respective rooms and the like, and each of the fire alarms 75 has a function for detecting/output presence/absence of a fire occurrence.

The pet animal feed supplying device 76 has a function for supplying feed to such a pet animal as a dog, a cat, or the like in response to a feed supplying instruction from the vehicle side.

The gas leakage detector 77 is provided near a place where a gas supplying equipment is placed, for example at a kitchen or the like, and it has a function for detecting/outputting presence/absence of a gas leakage occurrence.

The gas cut-off device 79 has a function for closing a gas valve in response to a gas cutting-off instruction from the gas leakage detector 77 and/or from the vehicle side.

Each of the illumination devices 81 and/or the air-conditioning apparatus 83 are constituted so as to turn the former on/off and/or switch the latter on/off in response to various instructions from the vehicle side.

The bath hot water supplying device 85 has a function for supplying hot water to a bathtub by a predetermined amount and/or heating water which has been supplied to the bathtub by the predetermined amount.

The entrance door key locking/unlocking device 87 is constituted with a function for performing locking/unlocking of the entrance door key in response to a locking/unlocking instruction from the vehicle side.

Next, operation of the call response system 11 for a vehicle will be explained in detail with reference to FIG. 4.

FIG. 4 is a flow chart showing a series of operations/actions in the call response method for a vehicle according to the present invention.

As shown in FIG. 4, in Step S11, while the home interphone 65 is put in the absence mode where a message and an image of a visitor which has visited an absent home are transferred to the vehicle side, when a visitor pushes the call button of the home interphone 65, the vehicle-mounted communication device 13 receives an interphone call including an image of the visitor and transfers the reception of the interphone call to the vehicle-mounted interphone 17 via the vehicle-mounted server 15. Incidentally, when the vehicle side is called from a portable telephone or the like, the vehicle-mounted communication device 13 receives a call including an image of a calling person and transfers the reception of the call to the vehicle-mounted interphone 17 via the vehicle-mounted server 15.

In Step S12, when the vehicle-mounted interphone 17 receives an interphone call including an image, a call reception previous notification for previously signaling the call reception is performed to appeal to one of the senses of hear, smell and touch except for the sense of sight or a combination of at least two of the three senses.

Herein, a plurality of examples of the call reception previous notification will be explained. First, the call reception previous notification for appealing to the sense of hear is performed by generating a sound or voice for previously signaling a call reception through the vehicle-mounted speaker, such as a chime sound generation for signaling a call reception, a sound or voice message "CALL HAS BEEN RECEIVED" or the like, or the like.

Also, the call reception previous notification for appealing to the sense of smell is performed by generating smell for previously signaling a call reception using the smell generator 29.

Furthermore, the call reception previous notification for appealing to the sense of touch is performed by generating vibrations for previously signaling a call reception using the steering wheel vibrator 25 and/or the seat vibrator 27. Incidentally, vibrations for previously signaling a call reception are imparted to at least one of the steering wheel and the driver's seat in the vehicle.

In Step S13, the vehicle-mounted server 15 maintains a state of a point of time when a call has been received, and it waits for a predetermined interval, for example, 5 seconds. The reason why the waiting period is set is because, if an image of a visitor or a calling person is instantaneously displayed without the waiting period, the eyes of a driver driving a vehicle are instantaneously attracted to the image. Namely, by setting the waiting period, the above situation is beforehand prevented from occurring, thereby serving to secure a safety driving or running of a vehicle.

In Step S14, the vehicle-mounted interphone 17 is performed by issuing a call reception main notification for presenting an image included in a call so as to appeal to the sense of sight of a driver in a vehicle. Specifically, the vehicle-mounted H/U 23 displays an image of a visitor near the entrance of the home and a written message "A VISITOR HAS COME. PLEASE PUSH PESPONSE BUTTON" on the display screen of the vehicle-mounted display 37 and generates a sound or voice guidance "A VISITOR HAS COME. PLEASE PUSH RESPONSE BUTTON". At this time, the visitor monitor camera 59 at the home side photographs an image of the visitor at the home side in response to operation information relating to a photographing instruction from the vehicle side and the image which has been photographed is transferred to the vehicle side at predetermined intervals.

In Step S15, when a driver or a vehicle occupant performs a pushing operation on the communication button 41 illustrated in FIG. 2 or 3 within a predetermined interval, for example, 10 seconds, it is assumed that he/she has an intention of communication, and the control routine advances to Step S16. On the other hand, when he/she does not perform a pushing operation on the communication button 41 or he/she performs a pushing operation on the rejection button 42 illustrated in FIG. 2 or 3 within the predetermined, it is assumed that communication is rejected, and the control routine advances to Step S18.

In Step S16, the vehicle-mounted interphone 17 transmits the pushing operation on the communication button 41 to the vehicle-mounted server 15 via the vehicle-mounted H/U 23 so that the vehicle-mounted server 15 transmits an interphone ON command back to the vehicle-mounted H/U 23. The vehicle-mounted H/U 23, switches the operation mode from a waiting mode to a communication mode allowing communication while the driver or the occupant is watching the image of the visitor via the interphone. Thereby, the image of the visitor near the entrance at the home side and a message "COMMUNICATON IN PROGRESS" are displayed on the display screen of the vehicle-mounted display 37. At this time, the visitor monitor camera 59 at the home side photographs an image of the visitor approaching the home side in response to operation signals regarding a photographing instruction from the vehicle side and updates the image which has been photographed at predetermined intervals, for example, each 3 seconds, to transmit the same to the vehicle side.

In Step S17, when a predetermined interval, for example 3 seconds, has been elapsed or the communication button 41 is pushed down again, it is assumed that the communication has been finished. Then, the vehicle-mounted server 15 transmits an interphone OFF command to the vehicle-mounted H/U 23 so that the vehicle mounted H/U 23 switches the operation mode of the vehicle-mounted interphone 17 to the communication mode to the waiting mode. At this time, a written message "COMMUNICATION FINISHED" is displayed on the display screen of the vehicle-mounted display 37 and a sound or voice guidance "COMMUNICATION FINISHED" is generated. Thus, a series of call response processing are terminated.

Meanwhile, In Step S18, when communication is rejected at the vehicle side, the vehicle-mounted server 15 causes the home side home interphone 65 to output a sound or voice guidance "CAN NOT RESPOND NOW, PLEASE RECORD MESSAGE" or the like, which requires a visitor to record an absence message. At this time, the visitor at the home side records a message according to the sound or voice guidance.

In Step S19, the vehicle-mounted server 15 receives the recorded absence data from the home interphone 65 at the home side and transmits the received recorded absence data to the vehicle-mounted interphone 17.

In Step S20, the vehicle-mounted interphone 17 reproduces the recorded data at the vehicle side. After reproduction, a series of call response processings are terminated.

The entire contents of Japanese Patent Application P11-6912 (filed on Jan. 13, 1999) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A call response method for use in a vehicle to respond to a call received from a system located at a call originating side, the call including at least one image generated by an image recording device in the system, the method comprising:

generating a first call reception notification by appealing to at least one sense chosen from a sense of hearing, a sense of smell, and a sense of touch of a driver;

waiting for a predetermined interval after generating a first call reception notification; and generating a second call reception notification after waiting for a predetermined interval, the second call reception notification including the image to appeal to a sense of sight of the driver.

2. The call response method of claim 1, wherein generating a first call reception notification by appealing to a sense of hearing includes generating a sound or a voice capable of notifying the driver of a call received from the system.

3. The call response method of claim 1, wherein generating a first call reception notification by appealing to a sense of smell includes generating a smell capable of notifying the driver of a call received from the system.

4. The call response method of claim 1, wherein generating a first call reception notification by appealing to a sense of touch includes generating vibration capable of notifying the driver of a call received from the system.

5. The call response method of claim 4, wherein generating vibration capable of notifying the driver of a call received from the system includes vibrating at least one item chosen from a steering wheel and a seat for the driver.

6. The call response method of claim 1, wherein the call is an interphone call that includes the at least one image received from an interphone, which has been provided on another side.

* * * * *

UNITED STATES PATENT AND TRADEMARK OFFICE
CERTIFICATE OF CORRECTION

PATENT NO. : 6,424,888 B1
DATED : July 23, 2002
INVENTOR(S) : Akira Sone and Masuo Sugiura It is certified that error appears in the above-identified patent and that said Letters Patent is hereby corrected as shown below:

<u>Title page,</u>
Item [57], ABSTRACT,
Line 6, "lease" should read -- least --.

<u>Column 10,</u>
Line 38, "a predetermined" should read -- the predetermined --.
Line 42, "a first call" should read -- the first call --.
Line 46, "a first call" should read -- the first call --.
Line 50, "a first call" should read -- the first call --.

Signed and Sealed this

Twenty-sixth Day of November, 2002

*Attest:*

JAMES E. ROGAN
*Attesting Officer*      *Director of the United States Patent and Trademark Office*